United States Patent [19]

Kovacs et al.

[11] Patent Number: 4,775,553
[45] Date of Patent: Oct. 4, 1988

[54] PRODUCTION OF MAGNETIC RECORDING MEDIA

[75] Inventors: Jenoe Kovacs, Hessheim; Peter Engelhardt, Plankstadt; Hermann Roller, Ludwigshafen; Lothar Schwarz, Oberkirch; Peter Nagel, Willstaett, all of Fed. Rep. of Germany

[73] Assignee: BASF Aktiengesellschaft, Ludwigshafen, Fed. Rep. of Germany

[21] Appl. No.: 887,936

[22] Filed: Jul. 22, 1986

[30] Foreign Application Priority Data

Jul. 24, 1985 [DE] Fed. Rep. of Germany ....... 3526415

[51] Int. Cl.$^4$ .............................................. H01F 10/02
[52] U.S. Cl. ..................................... 427/128; 428/900
[58] Field of Search ................................ 427/128–132; 428/900, 694

[56] References Cited

U.S. PATENT DOCUMENTS

| 4,613,545 | 9/1986 | Chubachi et al. | 428/900 X |
| 4,617,234 | 10/1986 | Aonuma et al. | 428/900 X |
| 4,632,868 | 12/1986 | Miyoshi et al. | 428/900 X |

*Primary Examiner*—Bernard D. Pianalto
*Attorney, Agent, or Firm*—Keil & Weinkauf

[57] ABSTRACT

Magnetic recording media are produced by dispersing pulverulent magnetic material in a mixture of a solvent, an organic polymer binder, a dispersant and other conventional additives, with the aid of a conventional dispersing apparatus and using a particular ceramic grinding medium, applying the resulting dispersion in the form of a layer on a base and then compacting the layer.

4 Claims, No Drawings

PRODUCTION OF MAGNETIC RECORDING MEDIA

The present invention relates to a process for the production of magnetic recording media by dispersing pulverulent magnetic material with the aid of a conventional dispersing apparatus in a mixture of a solvent, an organic polymer binder, a dispersant and other conventional additives, applying the resulting dispersion in the form of a layer on a base and then compacting the layer.

The preparation of dispersions containing pulverulent magnetic material in the production of magnetic recording media is known. These dispersions consist of a pulverulent magnetic material, a solvent or solvent mixture, one or more organic polymers or prepolymers which are soluble or dispersible in this solvent or solvent mixture, dispersants and further organic and/or inorganic additives, such as lubricants, viscosity regulators, stabilizers, inert inorganic substances for regulating the conductivity, the abrasion, the roughness, etc. The preparation of dispersions from the stated components is carried out in a dispersing apparatus, in general a mill, with the aid of which and by the action of a high shear gradient the pulverulent materials are substantially separated into their individual particles and coated with the binder. The resulting agglomerates of individual particles possess very different secondary particle diameters, depending on the method of preparation and the subsequent working up of the magnetic materials. However, for the preparation of high quality magnetic recording media, it is necessary for the magnetic particles, which are generally acicular, to be in the form of substantially identically shaped individual particles aligned in a predetermined the direction corresponding to the recording direction and at equal distances apart, the very small intermediate spaces being filled with binder and not containing any air or other foreign substances as inclusions. To meet these requirements, dispersing should be carried out under mild conditions, i.e., when the dispersing process is carried out in batchwise ball mills, stirred ball mills or continuous tube mills or by kettle milling, substantially so that the agglomerates are destroyed without individual needles fracturing.

However, the known dispersing methods have a number of disadvantages which are of course specific to the particular method. The entire dispersing process generally takes place slowly where precautions are taken to ensure that dispersing is effected in a mild manner. The disadvantages of the known milling methods are the low packing density, a large fraction of very fine particles which, when the material is processed to a dispersion, leads to wetting problems and thus to a particularly high solvent requirement, and furthermore the damage to the pigment structure, since the individual pigment needles are already partially fragmented before the agglomerates have been completely divided up. If, on the other hand, the amount of polymer present during dispersing is increased in order to incorporate the magnetic material in a mild manner, the milling effort required increases. In order to reduce this, high energy mills, i.e. dispersing apparatuses having a high localized energy density, e.g. stirred ball mills, planetary ball mills, sand mills or attrition mills, have been employed.

It is an object of the present invention to provide a process for the preparation of magnetic recording media which does not have the stated disadvantages. It is a particular object of the invention to design the procedure for dispersing the magnetic materials so that very homogeneous and stable dispersions are obtained and the dispersing effort is substantially reduced, resulting furthermore in a substantial improvement in the magnetic properties and hence in the recording properties of the resulting magnetic recording media.

We have found that this object is achieved in a simple manner by a process for the production of magnetic recording media according to the preamble of the claim if the dispersion is prepared in a stirred ball mill which is charged with a grinding medium comprising balls of more than 0.2 mm diameter and having a density of from 3.5 to 4.2 $g/cm^3$ and a Mohs' hardness of from 7 to 8.5, and the viscosity of the resulting dispersion, measured at 25° C., is not less than 100 mPa.s, with the proviso that the magnetic material employed has a BET specific surface area of not less than 23 $m^2/g$.

Particularly suitable grinding media for the novel process are spherical zirconium oxide-containing ceramic grinding media, particularly advantageously those which consist of from 60 to 80% by weight of zirconium oxide and from 20 to 40% by weight of silica. Corresponding materials containing alumina may also be used.

Ceramic grinding media suitable for the novel process comprise spherical balls having a diameter greater than 0.2 mm, preferably from 0.2 to 3.0 mm, in particular from 0.8 to 1.5 mm. Although grinding media comprising balls of smaller diameter substantially accelerate dispersing, they are very difficult to separate off from the ready-prepared dispersion. If, on the other hand, grinding media comprising balls of greater diameter are used, the dispersing time is increased. Moreover, larger balls tend to damage the material being dispersed.

The preparation of a dispersion with the novel process is carried out as follows: the magnetic material, the dispersant, the solvent and the dissolved binder, with or without further additives, are introduced into a stirred ball mill charged with the special ceramic grinding medium. The process can be carried out by a single-stage or two-stage procedure. In the single-stage dispersing process, the total amount of binder dissolved in the solvent is added before the beginning of the milling process. In the two-stage process which is most commonly used, only some, generally from one third to a half, of the total amount of binder is added before the beginning of the milling process, and the remaining amount is stirred in only after the dispersion has become homogeneous. To permit satisfactory processing of the dispersion, the latter should have a viscosity of not less than 100, in particular up to 600, mPa.s (measured at 25° C.).

The composition of the dispersion, which is used in the novel process for the production of magnetic recording media, otherwise corresponds to the prior art.

Preferably used magnetic materials are finely divided acicular gamma-iron(III) oxide having a mean particle size of from 0.1 to 2, in particular from 0.1 to 0.9, $\mu m$ or acicular chromium dioxide having the same particle structure as that stated for the iron oxide. Other suitable materials are gamma-iron(III) oxide doped with heavy metals, in particular with cobalt, finely divided metal alloys of iron, cobalt and/or nickel and suitable ferrite materials. Preferred magnetic materials are those which are very finely divided and in particular have a BET specific surface area of not less than 23, preferably not less than 26, m²/g. The specific surface area was determined according to DIN 66,123, by the onepoint difference method due to Haul and Dümbgen, using a Ströhlein areameter from Ströhlein, Düsseldorf, FRG.

Suitable binders for dispersing the finely divided magnetic material are the binders known for the preparation of magnetic layers, for example a nylon copolymer which is soluble in conventional solvents, a polyvinylformal, a polyurethane elastomer, mixtures of polyisocyanates and fairly high molecular weight polyhydroxy compounds or vinyl chloride copolymers containing more than 60% of vinyl chloride building blocks, e.g. a vinyl chloride copolymer with one or more comonomers, such as a vinyl ester of a monocarboxylic acid of 2 to 9 carbon atoms, or an ester of an aliphatic alcohol of 1 to 9 carbon atoms and an ethylenically unsaturated carboxylic acid of 3 to 5 carbon atoms, such as the esters of acrylic acid, methacrylic acid or maleic acid, or a copolymer of vinyl chloride with one or more of these carboxylic acids themselves as comonomers, or hydroxyl-containing vinyl chloride copolymers which can be prepared by partial hydrolysis of vinyl chloride/vinyl ester copolymers or direct copolymerization of vinyl chloride with hydroxylcontaining monomers, such as allyl alcohol or 4-hydroxybutyl or 2-hydroxyethyl (meth)acrylate. Other suitable binders are mixtures of one or more polyurethane elastomers with polyvinylformals, phenoxy resins and PVC copolymers of the composition stated above. Preferably used polyurethane elastomer binders are commercial elastomeric polyurethanes obtained from adipic acid, butane1,4-diol and 4,4'-diisocyanatodiphenylmethane. Also advantageous are OH-containing polyureaurethane binders which are crosslinked with a polyisocyanate and in which the OH-containing polyureaurethane is obtained by reacting a polydiol, a diol and a primary or secondary aminoalcohol, and, if required, a triol, with a diisocyanate.

Magnetic dispersions which are particularly useful for the production of rigid magnetic recording disks preferably contain binders such as epoxy resins, phenoxy resins, aminoplast precondensates, polyester resins, polyurethanes or polyurethane formers and mixtures of such binders with one another or with other binders, such as polycarbonates or vinyl polymers, e.g. vinyl chloride or vinylidene chloride copolymers or heat-curable acrylate or methacrylate copolymers.

Further additives for the preparation of magnetic layers, for example small amounts of monocarboxylic acids, mixtures or esters of these, and fillers, such as carbon black, graphite, powdered quartz, nonmagnetic $\alpha$-$Fe_2O_3$ and/or powders based on silicates, and flow improvers, such as small amounts of silicone oil, may be added to the dispersions. The total amount of these additives advantageously should not exceed 12, preferably 8, % by weight, based on the magnetic material.

The magnetic dispersion is applied on to the nonmagnetizable base with the aid of a conventional coating apparatus, e.g. a knife coater. Suitable nonmagnetic and nonmagnetizable bases are the conventional bases, in particular films of linear polyesters, such as polyethylene terephthalate, generally having a thickness of from 1 to 200 μm, in particular from 6 to 36 μm. Before the still liquid coating mixture is dried on the base, a procedure which is advantageously carried out at from 50° to 90° C. for from 2 to 5 minutes, the anisotropic magnetic particles are oriented along the intended recording direction, if necessary by the action of a magnetic field. The magnetic layers can then be calendered and compacted on conventional machines, by being passed between heated and polished rollers. The thickness of the magnetic layer is generally from 1 to 10 μm.

Surprisingly, by using the novel process, in particular extremely finely divided magnetic particles, especially those having a BET specific surface area of not less than 23 m²/g, which are required for magnetic recording media having a high maximum output level and a high signal-to-noise ratio can be dispersed in a simple manner which causes virtually no damage to the particle shape. Particularly in the case of magnetic recording media for video recording, good magnetic properties, small particle size, a substantially uniform particle size distribution and a homogeneous coating structure are required in order to ensure high quality. It is precisely these, generally conflicting, property profiles which can be achieved by the novel process in a particularly advantageous manner.

The Examples which follow illustrate the invention and compare it with prior art experiments.

EXAMPLE 1

700 parts of an acicular iron powder having a mean particle length of 0.3 μm, a BET specific surface area of 44 m²/g and a coercive force of 109 kA/m were dispersed for 32 hours together with 91 parts of a spherical $Al_2O_3$ powder, having a mean particle diameter of 0.6 μm, in 722.8 parts of a 13% strength solution of a thermoplastic polyester urethane, obtained from adipic acid, butane-1,4-diol and 4,4'-diisocyanatodiphenylmethane, in a mixture of equal amounts of tetrahydrofuran and dioxane, 201.3 parts of a 20% strength solution of a phenoxy resin, obtained from bisphenol A and epichlorohydrin and having a mean molecular weight of 30,000 and a hydroxyl content of 6%, in the abovementioned solvent mixture, and a further 264.1 parts of this solvent mixture in a stirred ball mill having a capacity of 6,000 parts by volume and containing 2,330 parts of balls consisting of 69% of $ZrO_2$ and 31% of $SiO_2$ and having a diameter of from 1 to 1.5 mm, with the addition of 3.5 parts of stearic acid and 55.4 parts of a dispersant based on a mixture of an oxyethylated monophosphate and a salt of an ethylhexyl sulfosuccinate. Thereafter, 23.7 parts of methyl stearate were introduced and dispersing was continued for a further 5 hours. When dispersing was complete, 46.7 parts of a 50% strength solution of a triisocyanate, prepared from 3 moles of toluylene diisocyanate and 1 mole of 1,1,1-trimethylolpropane, in ethyl acetate were added, and stirring was continued for a further 15 minutes. The dispersion was filtered and then applied in the form of a layer on a 10 μm thick polyethylene terephthalate film, with simultaneous orientation of the magnetic particles using a permanent magnet. The magnetic layer, which was 3 μm thick after drying, was calendered by being passed between heated rollers under pressure (90° C., nip pressure 200 kg/cm), and the coated film web was slit into half-inch wide tapes.

The magnetic properties were measured in a magnetic field of 800 kA/m. The surface roughness was determined as the average peak-to-valley height $R_Z$ according to DIN 4768, sheet 1. The video properties were determined by comparison with a $CrO_2$ reference tape, on a VHS recorder from Victor Company of Japan. The results of the measurements are shown in Table 1.

COMPARATIVE EXPERIMENT 1

The procedure described in Example 1 was followed, except that, instead of the grinding medium based on $ZrO_2$, 4,200 parts of steatite balls having an average diameter of 1.3 mm were used. The results of the measurements are shown in Table 1.

COMPARATIVE EXPERIMENT 2

The procedure described in Example 1 was followed, except that, instead of the grinding medium based on $ZrO_2$, 8,000 parts of steel balls having a diameter of 2 mm were used. The dispersing time required was 168 hours. The results of the measurements are shown in Table 1.

COMPARATIVE EXPERIMENT 3

The mixture described in Example 1 was dispersed for 93 hours in a stirred ball mill from Feinmahltechnik Netzsch, Selb, 1,500 parts of glass balls having a diameter of 2 mm being used as the grinding medium. When the dispersion was filtered, a very large number of glass fragments were found in the residue.

The results of the measurements are shown in Table 1.

COMPARATIVE EXPERIMENT 4

The procedure described in Comparative Experiment 3 was followed, except that, instead of the glass balls, 4,200 parts of steel balls having a diameter of 2 mm were used as the grinding medium. The dispersing time was 37 hours. The results of the measurements are shown in Table 1.

TABLE 1

| | Example 1 | Comparative experiments 1 | 2 | 3 | 4 |
|---|---|---|---|---|---|
| Average peak-to-valley height $R_z$ [μm] | 0.18 | 0.18 | 0.18 | 0.17 | 0.16 |
| Magnetic properties | | | | | |
| Coercive force $H_c$ [kA/m] | 107.6 | 103.1 | 101.2 | 104.5 | 102.3 |
| Residual magnetization Mr [mT] | 307 | 268 | 275 | 283 | 271 |
| Orientation ratio RF | 1.9 | 1.5 | 1.5 | 1.7 | 1.8 |
| Video characteristics | | | | | |
| Luminance S/N [dB] | +9 | +5.5 | +4.5 | +6 | +5.5 |
| Chroma S/N [dB] | +5 | +4.0 | +4.0 | +3.5 | +2.5 |
| Tape errors [D · O/min] | 150 | 450 | 150 | >3000 | 300 |

EXAMPLE 2

853 parts of a 1.5% strength solution of a thermoplastic polyester urethane, obtained from adipic acid, butane-1,4-diol and 4,4'-diisocyanatodiphenylmethane, in a mixture of equal amounts of tetrahydrofuran and dioxane, and 123 parts of a 20% strength solution of a phenoxy resin, obtained from bisphenol A and epichlorohydrin, in the same solvent mixture were dispersed for 72 hours with 1,200 parts of a chromium dioxide having a coercive force of 48.5 kA/m and a BET specific surface area of 28.0 m²/g, 3.0 parts of zinc oleate and a further 880 parts of the stated solvent mixture in a stirred ball mill having a capacity of 6,000 parts by volume and containing 2,500 parts of balls consisting of 69% of $ZrO_2$ and 31% of $SiO_2$ and having a diameter of from 1 to 1.5 mm. Thereafter, a further 853 parts of the stated polyester urethane solution and 132 parts of the phenoxy resin solution, 36 parts of butyl stearate, 6 parts of stearic acid and 533 parts of the stated solvent mixture were added, and dispersing was continued for a further 24 hours. The dispersion obtained was filtered under pressure through a filter having 1 μm pores, mixed with 13 parts, per kg of dispersion, of a 50% strength solution of a triisocyanate, obtained from 3 moles of toluylene diisocyanate and 1 mole of 1,1,1-trimethylolpropane, in ethyl acetate, and applied on to a 14.5 μm thick polyethylene terephthalate film by means of a conventional knife coater.

The coated film was passed through a magnetic field to orient the magnetic particles and then dried at from 60° to 80° C. After drying, the magnetic layer of the coated film was compacted and calendered by being passed twice between heated rollers at 85° C. under a nip pressure of 35 kg/cm. The magnetic layer was then 3 μm thick. The coated film was slit into half-inch wide video tapes and the latter were tested on a commercial V 2000 recorder from Grundig, at a speed of 2.44 cm/sec, in comparison with a reference tape (0 dB). The magnetic properties were determined in a magnetic field of 160 kA/m. The results of the measurements are shown in Table 2.

COMPARATIVE EXPERIMENT 5

The procedure described in Example 2 was followed, except that, instead of the balls based on $ZrO_2$, 8,000 parts of steel balls having a diameter of 4 mm were used and dispersing was carried out for 168 hours. The results of the measurements are shown in Table 2.

EXAMPLE 3

810 parts of a cobalt-modified iron oxide having a coercive force of 49 kA/m and a BET specific surface area of 28 m²/g were dispersed for 72 hours together with 90 parts of a chromium dioxide powder according to Example 2, 27 parts of spherical $Al_2O_3$ particles having a mean diameter of 0.4 μm, 27 parts of sodium oleate, 601 parts of a 12.5% strength solution of a thermoplastic polyester urethane, obtained from adipic acid, butane-1,4-diol and 4,4'-diisocyanatodiphenylmethane, in a mixture of equal amounts of tetrahydrofuran and dioxane, 94 parts of a copolymer of 91 parts of vinylidene chloride and 9 parts of vinyl acetate, and a further 660 parts of the solvent mixture consisting of equal amounts of tetrahydrofuran and dioxane, in a stirred ball mill containing 2,500 parts of balls comprising 69% of $ZrO_2$ and 31% of $SiO_2$ and having a diameter of from 1 to 1.5 mm. Thereafter, 781 parts of the stated polyurethane solution, 122 parts of the copolymer, 27 parts of methyl stearate, 4.5 parts of stearic acid and 150 parts of the solvent mixture were added and dispersing was continued for a further 24 hours. The dispersion was further processed as described in Example 2, and the resulting videotapes were tested in a similar manner. The results of the measurements are shown in Table 2.

COMPARATIVE EXPERIMENT 6

The procedure described in Example 3 was followed, except that, instead of the balls based on $ZrO_2$, 8,000 parts of steel balls having a diameter of 4 mm were used and dispersing was carried out for 168 hours. The results of the measurements are shown in Table 2.

TABLE 2

|  | Example 2 | Comparative experiment 5 | Example 3 | Comparative experiment 6 |
|---|---|---|---|---|
| Average peak-to-valley height $R_z$ [μm] | 0.14 | 0.13 | 0.16 | 0.15 |
| Magnetic properties |  |  |  |  |
| Coercive force $H_c$ [kA/m] | 49.6 | 50.0 | 55.9 | 54.1 |
| Residual magnetization Mr [mT] | 166 | 131 | 168 | 132 |
| Orientation ratio RF | 2.9 | 1.72 | 2.2 | 1.43 |
| Video characteristics |  |  |  |  |
| Luminance S/N [dB] | +1.8 | +0.8 | +1.2 | +0.2 |
| Chroma S/N [dB] | +2.8 | +1.2 | +2.4 | +1.2 |
| Tape errors [D · O/min] | 32 | 50 | 26 | 65 |

EXAMPLE 4

700 parts of an acicular iron powder having a mean particle length of 0.3 μm, a BET specific surface area of 43 m²/g and a coercive force of 81 kA/m were dispersed for 72 hours together with 95.2 parts of a spherical $Al_2O_3$ powder having a mean particle diameter of 0.4 μm in 377 parts of a 13% strength solution of a thermoplastic polyester urethane, obtained from adipic acid, butane-1,4-diol and 4,4'-diisocyanatodiphenylmethane, in a mixture of equal amounts of tetrahydrofuran and dioxane, 105 parts of a 20% strength solution of a phenoxy resin obtained from bisphenol A and epichlorohydrin and having a mean molecular weight of 30,000 and a hydroxyl content of 6%, in the abovementioned solvent mixture, and a further . . . parts of this solvent mixture in a stirred ball mill having a capacity of 6,000 parts by volume and containing 2,500 parts of balls consisting of 69% of $ZrO_2$ and 31% of $SiO_2$ and having a diameter of from 1 to 1.5 mm, 14 parts of a commercial flow improver based on an alkylammonium salt of a dimeric fatty acid and 42 parts of a dispersant based on a mixture of an oxyethylated monophosphate and a salt of an ethylhexyl sulfosuccinate being added. Thereafter, 161 parts of the stated polyurethane solution, 45 parts of the phenoxy resin solution, 10.4 parts of a silicone oil and 35 parts of stearic acid were added, and dispersing was continued for 54 hours. When dispersing was complete, 59.6 parts of a 50% strength solution of a triisocyanate, obtained from 3 moles of toluylene diisocyanate and 1 mole of 1,1,1-trimethylolpropane, in ethyl acetate were added to the dispersion, and stirring was continued for 15 minutes. The dispersion was applied on to a 6 μm thick polyethylene terephthalate film by means of a conventional knife coater. The coated film was passed through a magnetic field to orient the magnetic particles and then dried at from 50° to 90° C. After drying, the magnetic layer was compacted and calendered by being passed, under a nip pressure of 200 kg/cm, between rollers heated at 70° C., so that the thickness of the magnetic layer was 4.5 μm. The coated film was then slit into 3.81 mm wide tapes for audio use.

The peak-to-valley height of the magnetic layer was measured as described in Example 1. The magnetic properties were measured in a magnetic field of 100 kA/m. The electroacoustic properties were determined according to DIN 45,401, DIN 45,403 and DIN 45,512, sheet 12, by comparison with reference tape IEC I. The results of the measurements are shown in Table 3.

COMPARATIVE EXPERIMENT 7

Example 4 was repeated, 1,500 parts of glass balls having a diameter of 2 mm being used as the grinding medium. The results of the measurements are shown in Table 3.

TABLE 3

|  | Example 4 | Comparative experiment 7 |
|---|---|---|
| Layer thickness [μm] | 3.1 | 3.2 |
| Average peak-to-valley height $R_z$ [μm] | 0.16 | 0.15 |
| Coercive force $H_c$ [kA/m] | 83.3 | 83.3 |
| Residual magnetization Mr [mT] | 375 | 312 |
| Orientation ratio | 2.3 | 2.2 |
| Electroacoustic data: by comparison with reference tape IEC I: |  |  |
| Sensitivity 315 Hz (dB) | 0 | −1.3 |
| Sensitivity 10 kHz (dB) | +0.5 | −1.1 |
| Maximum output level 315 Hz (dB) | +1.0 | −1.1 |
| Maximum output level 10 kHz (dB) | +1.5 | −0.5 |

We claim:

1. A process for the production of magnetic recording media by dispersing finely divided magnetic material in a mixture of a solvent, an organic polymer binder, a dispersant and other conventional additives, applying in dispersion in the form of a layer on a base and then solidifying the layer, wherein the dispersion is prepared by introducing the finely divided magnetic material, solvent, dispersant, further additives and at least a portion of the organic polymer binder into a stirred ball mill and subjecting the introduced components to a grinding medium comprising ceramic balls having a mean diameter of from 0.2 to 3 mm, a density of from 3.5 to 4.2 g/cm³ and a Mohs' hardness of from 7 to 8.5, to form a homogeneous dispersion having a viscosity measured at 25° C., of not less than 100 mPa.s, the dispersed magnetic material having a particle shape which is substantially undamaged by the grinding medium, with the proviso that the finely divided magnetic material employed has a BET specific surface area of not less than 23 m²/g.

2. The process of claim 1, wherein the dispersion is prepared in a stirred ball mill which is charged with a grinding medium comprising ceramic balls consisting of from 60 to 80% by weight of ZrO$_2$ and from 20 to 40% by weight of SiO$_2$ and having a mean diameter of from 0.8 to 1.5 mm.

3. The process of claim 1, wherein from about one-half to two-thirds of the binder is added to the ball mill after a homogeneous dispersion has been obtained.

4. The process of claim 1, wherein the final dispersion has a viscosity, measured at 25° C., of at least 600 m Pa.s.

* * * * *